(12) United States Patent
Kobayashi et al.

(10) Patent No.: US 7,967,388 B2
(45) Date of Patent: Jun. 28, 2011

(54) VEHICLE BACKREST STRUCTURE

(75) Inventors: Takeshi Kobayashi, Saitama (JP); Masahiro Inoue, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 252 days.

(21) Appl. No.: 12/201,827

(22) Filed: Aug. 29, 2008

(65) Prior Publication Data
US 2009/0072603 A1 Mar. 19, 2009

(30) Foreign Application Priority Data

Aug. 31, 2007 (JP) ................................ 2007-226562

(51) Int. Cl.
*A47C 7/00* (2006.01)
(52) U.S. Cl. .................. 297/440.2; 297/353; 297/357; 297/452.39
(58) Field of Classification Search .................. 297/353, 297/383, 440.2, 440.21, 354.11, 14, 217.7, 297/452.39, 357, 377
See application file for complete search history.

(56) References Cited

U.S. PATENT DOCUMENTS

| | | | | |
|---|---|---|---|---|
| 360,764 A * | 4/1887 | De Voe | ...................... | 297/366 |
| 481,745 A * | 8/1892 | Brunsman et al. | ......... | 297/440.2 |
| 717,026 A * | 12/1902 | Ostendorf | ..................... | 297/320 |
| 947,909 A * | 2/1910 | Herman | ......................... | 297/357 |
| 1,332,957 A * | 3/1920 | Schramm | ..................... | 297/383 |
| 1,968,232 A * | 7/1934 | Thomas | ......................... | 296/69 |
| 2,021,120 A * | 11/1935 | Wilkins | ......................... | 297/317 |
| 2,153,155 A * | 4/1939 | Page et al. | ..................... | 297/342 |
| 2,540,672 A * | 2/1951 | Holmes | ................... | 297/174 CS |
| 2,612,207 A * | 9/1952 | Branson | ........................ | 297/331 |
| 3,101,972 A * | 8/1963 | Laughlin | ...................... | 297/377 |
| 3,206,247 A * | 9/1965 | Johnson | ........................ | 297/254 |
| 3,452,372 A * | 7/1969 | Emery | ............................ | 5/634 |
| 3,649,074 A * | 3/1972 | McDonald et al. | ........... | 297/153 |
| 3,899,209 A * | 8/1975 | Schulz | .......................... | 297/383 |
| 4,015,878 A * | 4/1977 | Perkins | ........................ | 297/357 |
| 4,084,849 A * | 4/1978 | Ishida et al. | ..................... | 297/22 |
| 4,339,149 A * | 7/1982 | Nakao et al. | ............. | 297/256.13 |
| 4,533,176 A * | 8/1985 | Wyttenbach | .................. | 297/238 |
| 4,558,903 A * | 12/1985 | Takagi | .......................... | 297/408 |
| 4,805,928 A * | 2/1989 | Nakao et al. | .................. | 280/642 |
| 5,160,185 A * | 11/1992 | Stang | ............................ | 297/377 |
| 5,507,563 A * | 4/1996 | Arthur, Jr. | ................. | 297/440.23 |
| 5,551,756 A * | 9/1996 | Gurasich et al. | ........... | 297/440.2 |
| 5,954,402 A * | 9/1999 | McInturff | .................. | 297/440.22 |
| 5,984,418 A * | 11/1999 | McInturff | .................. | 297/440.24 |
| 6,695,378 B2 * | 2/2004 | Hanagan | ..................... | 296/65.01 |
| 7,188,902 B1 * | 3/2007 | Chen | ............................. | 297/357 |
| 7,234,777 B2 | 6/2007 | Schweikarth et al. | | |
| 7,611,203 B1 * | 11/2009 | Roberts et al. | ............. | 297/344.2 |
| 2004/0183354 A1* | 9/2004 | Rodriguez | ..................... | 297/377 |

FOREIGN PATENT DOCUMENTS

DE 195 33 070 A1 3/1997
JP 5-170132 A 7/1993

* cited by examiner

*Primary Examiner* — David Dunn
*Assistant Examiner* — David E Allred
(74) *Attorney, Agent, or Firm* — Birch, Stewart, Kolasch & Birch, LLP

(57) ABSTRACT

A backrest structure capable for a vehicle having seats that are supported on a vehicle body frame via a seat frame as a seat support member. Each of the seats includes a seat back as a backrest supporting a back of a driver. The seat back is removably mounted in the seat frame, thereby permitting positional adjustments in vertical and longitudinal directions to fit a body type of the driver. The resulting configuration makes driving of the vehicle easier.

8 Claims, 15 Drawing Sheets

VEHICLE BACKREST STRUCTURE

CROSS-REFERENCE TO RELATED APPLICATION

The present application claims priority under 35 U.S.C. §119 to Japanese Patent Application No. 2007-226562, filed Aug. 31, 2007, the entire contents of which are hereby incorporated by reference.

BACKGROUND OF THE INVENTION

1. Field of the Invention

The present invention relates to an improved backrest structure for a vehicle.

2. Description of Background Art

A known arrangement for a vehicle backrest structure includes a backrest supporting a back of a driver disposed in a rear pillar supporting a roof (see, for example, Japanese Patent Laid-open No. Hei 5-170132.

The known art disclosed in Japanese Patent Laid-open No. Hei 5-170132 will be described below with reference to FIGS. 1, 3, 7, and 8 thereof.

A pair of left and right roof pillars 32, 32 is erected from a front portion of a vehicle body frame 1 and a pair of left and right rear pillars 30, 30 is erected from a rear portion of the vehicle body frame 1. The pair of left and right roof pillars 32, 32 and the pair of left and right rear pillars 30, 30 support a roof 43. A backrest 56 is mounted to the left and right rear pillars 30, 30.

Supposing, for example, that drivers of different body types ride a vehicle, it would be easier to drive the vehicle and preferable if the backrest 56 can be adjusted vertically and/or longitudinally to better fit the body type of the specific driver.

SUMMARY AND OBJECTS OF THE INVENTION

It is an object of the present invention to provide a vehicle backrest structure capable of making driving easier.

According to an embodiment of the present invention, in a vehicle having a seat supported on a vehicle body frame via a seat support member, the seat including a backrest supporting a back of a driver, the backrest is removably mounted in the seat support member and permits positional adjustments in vertical and longitudinal directions.

As an effect, when a driver having a different body type rides the vehicle, the backrest is adjusted for height and a longitudinal position to fit the specific body type of the driver.

According to an embodiment of the present invention, the backrest includes a first hook and a second hook disposed upwardly and rearwardly of the first hook, the first hook and the second hook being disposed on a backside of the backrest. Further, the first hook and the second hook are selectively hooked onto a side of the seat support member.

As an effect, hooking the second hook onto the side of the seat support member moves the backrest to a point lower and forward than when the first hook is hooked onto the side of the seat support member.

According to an embodiment of the present invention, the seat support member includes a cross member and a mounting tab. The cross member is disposed at an upper rear end of the seat support member and extends in a vehicle width direction. The mounting tab extends upwardly from the cross member. Either the first hook or the second hook is hooked onto the cross member. Further, the backrest includes a first protrusion and a second protrusion. The first protrusion is removably attached to the mounting tab when the first hook is hooked onto the cross member. The second protrusion is removably attached to the mounting tab when the second hook is hooked onto the cross member. Both the first protrusion and the second protrusion are disposed on the backside of the backrest.

As an effect, when the first hook is hooked onto the cross member, the first protrusion is attached to the mounting tab. When the second hook is hooked onto the cross member, the second protrusion is attached to the mounting tab. The backrest can thereby be reliably supported through the respective combination of the first hook and the first protrusion and of the second hook and the second protrusion.

The backrest is removably mounted on the seat support member and adjustable vertically and longitudinally. The backrest can therefore be adjusted for height and a longitudinal position to fit a body type of a driver. This makes for easier driving.

In addition, the backrest has, on the backside thereof, the first hook and the second hook disposed upwardly and rearwardly of the first hook. The first hook and the second hook are selectively hooked onto the side of the seat support member. A height and a longitudinal position of the backrest can therefore be changed with the simple structure, contributing to a reduced cost.

Further, the seat support member includes the cross member and the mounting tab. The cross member is disposed at the upper rear end of the seat support member and extends in the vehicle width direction. The mounting tab extends upwardly from the cross member Either the first book or the second hook is hooked onto the cross member. Further, the backrest includes the first protrusion and the second protrusion. The first protrusion is removably attached to the mounting tab when the first hook is hooked onto the cross member. The second protrusion is removably attached to the mounting tab when the second hook is hooked onto the cross member. Both the first protrusion and the second protrusion are disposed on the backside of the backrest. The backrest can thereby be reliably supported through the respective combination of the first hook and the first protrusion and of the second hook and the second protrusion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
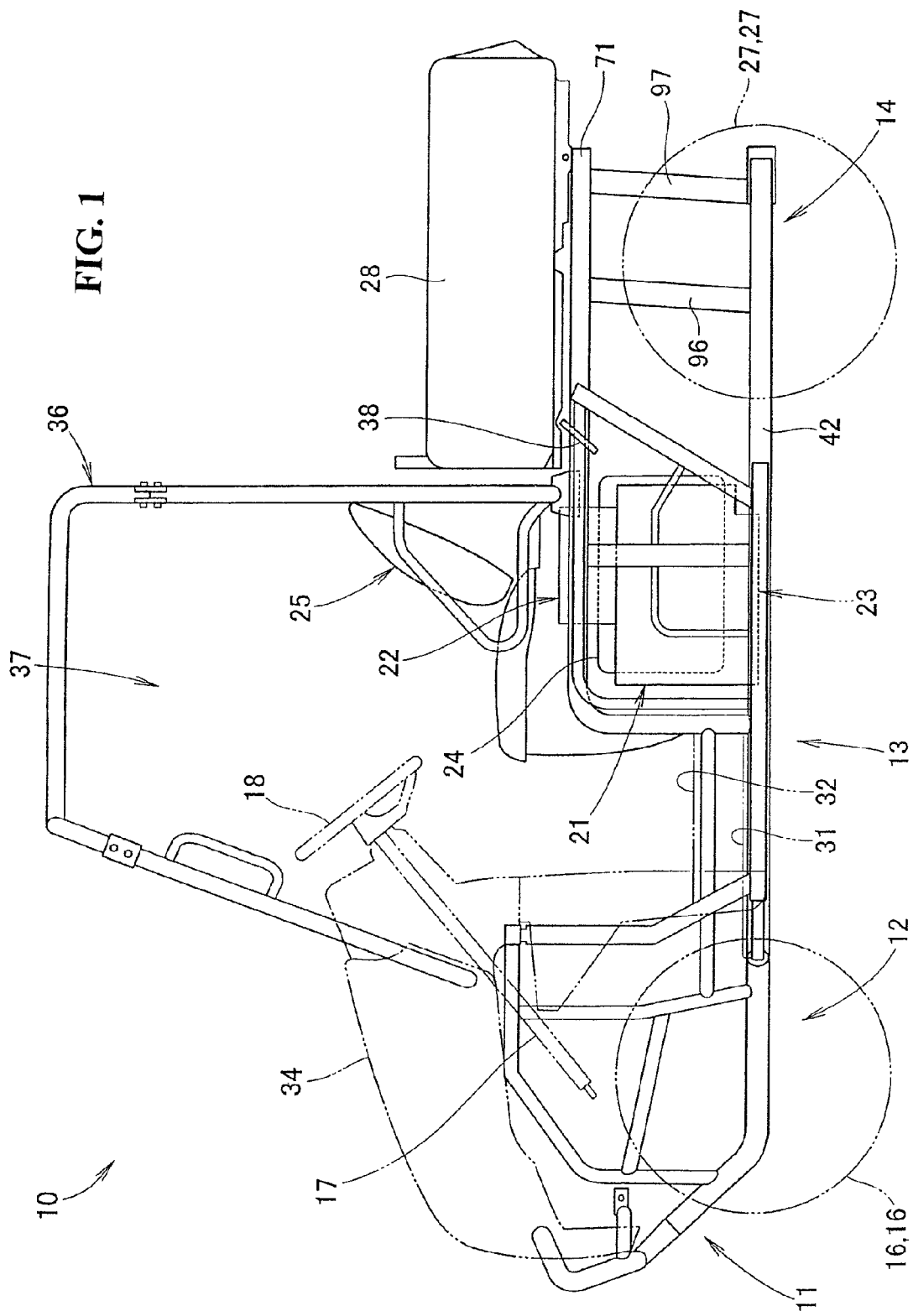
FIG. 1 is a side elevational view showing a vehicle incorporating a frame structure according to the present invention.

FIG. 1 is a side elevational view showing a vehicle incorporating a frame structure according to the present invention. A vehicle 10 is an all terrain vehicle. The vehicle 10 includes a vehicle body frame 11 that, in turn, includes a front frame 12, a center frame 13, and a rear frame 14. The front frame 12 includes a front wheel suspension (not shown), disposed thereon, suspending left and right front wheels 16, 16. The front frame 12 further includes steering members (a steering shaft 17, a steering wheel 18 disposed on an upper end of the steering shaft 17, and the like) steering the front wheels 16. The center frame 13 is mounted with a power unit 21 (including an engine 22 and a transmission 23 integrated with the engine 22), a fuel tank 24, and left and right seats 25, 26 (only reference numeral 25 representing the seat on a proximal side is shown). The rear frame 14 is mounted with a rear wheel suspension (not shown) suspending left and right rear wheels 27, 27 and a cargo bed 28 that can be tilted.

The center frame 13 includes a pair of left and right steps 31, 31 (only reference numeral 31 representing the step on the proximal side is shown), on which an occupant steps as he or she gets on the vehicle 10, and a floor portion 32, which is one step higher than the step 31. Occupants sitting on the seats 25, 26 place their feet on the floor portion 32. It is to be noted that reference numeral 34 denotes a front cover, reference numeral 36 denotes a roll cage fitted to the front cover 34 and the center frame 13, and reference numeral 37 denotes a cabin enclosed by the roll cage 36 above the center frame 13.

The cargo bed 28 is pivotally movable about a pivot disposed in a rear upper portion of the rear frame 14. Specifically, operating an operation lever 38 unlocks a cargo bed fixing lock, so that a front portion of the cargo bed 28 can be swung upwardly about the pivot.

Figure 2:
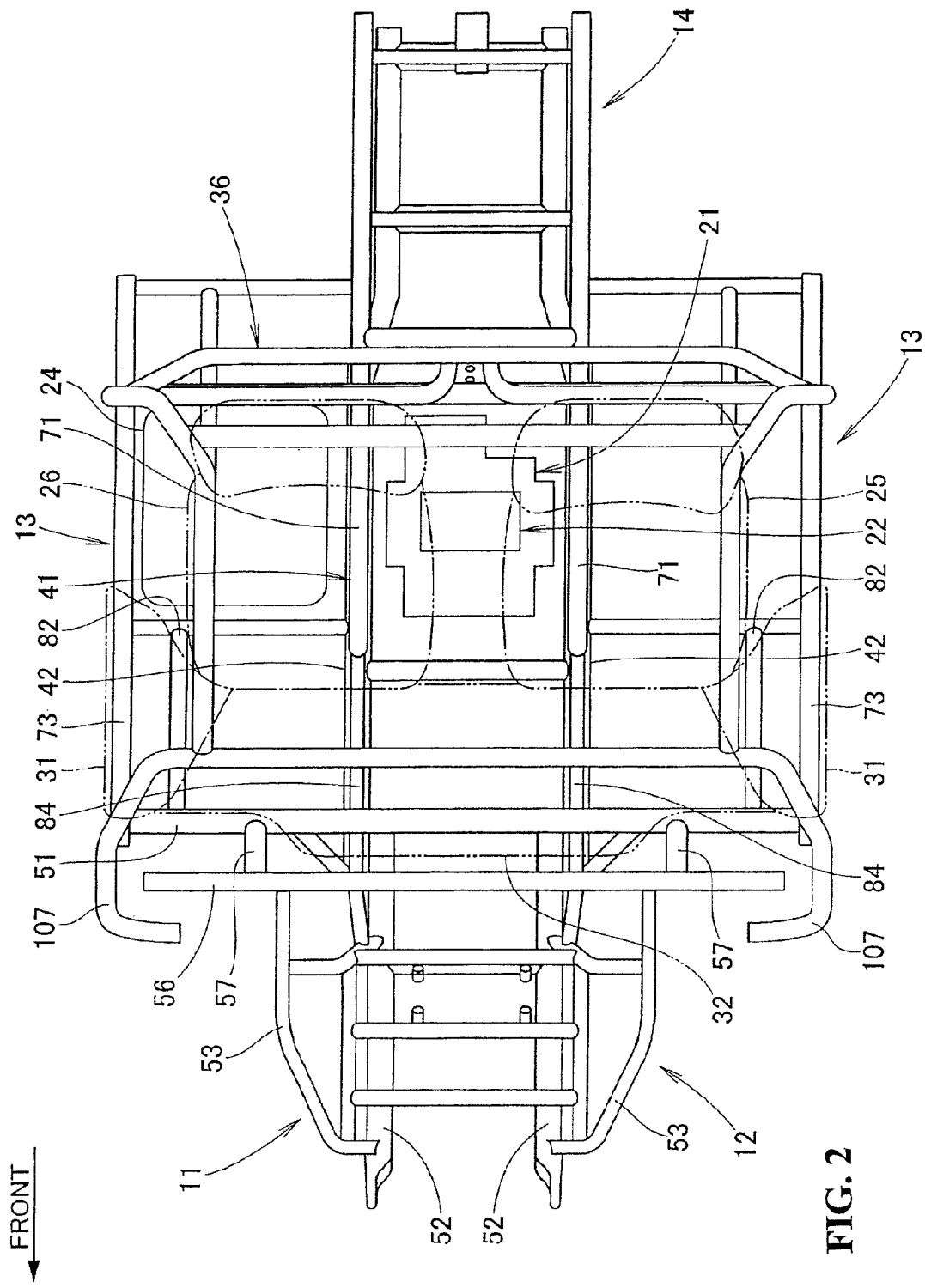
FIG. 2 is a plan view showing the vehicle according to the present invention.

FIG. 2 is a plan view showing the vehicle 10 according to the present invention A seat support frame 41 supporting the seats 25, 26 is disposed on the center frame 13 of the vehicle body frame 11. The power unit 21 is disposed between a pair of left and right lower main frames 42, 42 extending in a vehicle longitudinal direction at a position downward of the seats 25, 26. The fuel tank 24 is disposed on the right of the power unit 21 and downward of the right seat 26.

Figure 3:
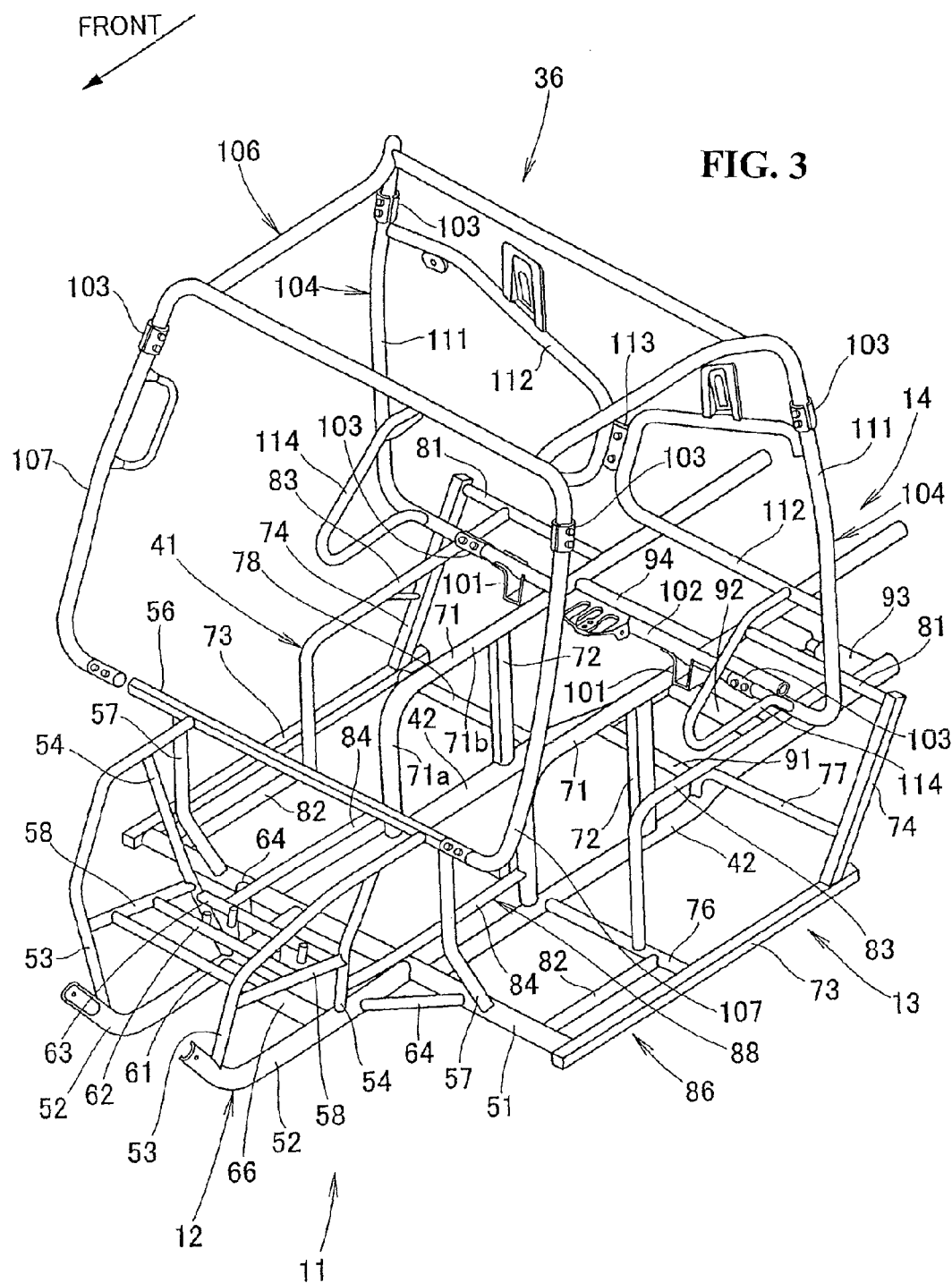
FIG. 3 is a perspective view showing a vehicle body frame and a roll cage according to the present invention.

FIG. 3 is a perspective view showing the vehicle body frame 11 and the roll cage 36 according to the embodiment of the present invention.

The front frame 12 of the vehicle body frame 11 includes a lower cross member 51, a pair of left and right front lower side frames 52, 52, a pair of left and right front first sub-frames 53, 53, a pair of left and right front second sub-frames 54, 54, an upper cross member 56, a pair of left and right connection frames 57, 57, front intermediate frames 58, 58, cross members 61, 62, a cross member 63, reinforcement frames 64, 64, and a cross member 66. Specifically, the lower cross member 51 is disposed at front ends of the lower main frames 42, 42. The front lower side frames 52, 52 are extended forwardly from the lower cross member 51. The front first sub-frames 53, 53 are made to rise upwardly from respective front ends of the front lower side frames 52, 52. The front second sub-frames 54, 54 are made to rise upwardly from the respective front lower side frames 52, 52 and have leading ends attached to the front first sub-frames 53, 53.

The upper cross member 56 is attached to respective rear ends of the front first sub-frames 53, 53. The connection frames 57, 57 connect the lower cross member 51 with the upper cross member 56. The front intermediate frames 58, 58 are disposed across the front first sub-frames 53, 53 and the front second sub-frames 54, 54. The cross members 61, 62 are disposed across the two front intermediate frames 58, 58. The cross member 63 is disposed across the two front second sub-frames 54, 54. The reinforcement frames 64, 64 are disposed across the lower cross member 51 and the corresponding one of the front lower side frames 52, 52. The cross member 66 is disposed across the two front lower side frames 52, 52.

The front lower side frames 52, 52 and the front intermediate frames 58, 58 are members on which brackets (not shown) for supporting vertically swingably front wheel suspension arms.

The center frame 13 includes the pair of left and right lower main frames 42, 42, a pair of left and right inner seat support frames 71, 71, center riser frames 72, 72, a pair of left and right step outer frames 73, 73, a pair of left and right inclined frames 74, 74, a pair of left and right step front cross members 76, 76 (only one of reference numerals 76, 76 is shown), a left rear cross member 77, a right rear cross member 78, a pair of left and right rear upper cross members 81, 81, step sub-frames 82, 82, outer seat support frames 83, 83, and a pair of left and right floor sub-frames 84, 84. Specifically, the inner seat support frames 71, 71 are made to rise upwardly from corresponding ones of the lower main frames 42, 42 and extended rearwardly. The center riser frames 72, 72 are disposed across the lower main frames 42, 42 and horizontal portions of the inner seat support frames 71, 71. The step outer frames 73, 73 are extended rearwardly from both ends of the lower cross member 51. The inclined frames 74, 74 are extended obliquely upwardly toward the rear from rear ends of the step outer frames 73, 73. The step front cross members 76, 76 are disposed across the lower main frames 42, 42 and the step outer frames 73, 73.

The left rear cross member 77 is extended inwardly of the vehicle body from an intermediate portion of the left inclined frame 74 and then bent downwardly to have a leading end fitted to the left lower main frame 42. The right rear cross member 78 is disposed across the right step outer frame 73 and the right lower main frame 42. The rear upper cross members 81, 81 are disposed across rear ends of the inclined frames 74, 74 and the inner seat support frames 71, 71. The step sub-frames 82, 82 are disposed across the lower cross member 51 and corresponding ones of the step front cross members 76, 76. The outer seat support frames 83, 83 are made to rise upwardly from intermediate portions of the step front cross members 76, 76 and extended rearwardly to have leading ends attached to the rear upper cross members 81, 81. The floor sub-frames 84, 84 are disposed across the inner seat support frames 71, 71 and the front second sub-frames 54, 54.

The lower cross member 51, the step outer frames 73, 73, the step front cross members 76, 76, and the step sub-frames 82, 82 constitute a step support frame 86 supporting the steps 31 (see FIG. 1).

The left and right floor sub-frames 84, 84 constitute a floor portion support frame 88 supporting the floor portion 32 (see FIG. 1).

The inner seat support frames 71, 71 and the outer seat support frames 83, 83 constitute the seat support frame 41.

The rear frame 14 includes the left and right lower main frames 42, 42, the left and right inner seat support frames 71, 71, cross members 91 to 93, a cross member 94, a pair of left and right rear first riser frames 96, 96 (see FIG. 1; only one of reference numerals 96, 96 is shown), and a pair of left and right rear second riser frames 97, 97 (see FIG. 1; only one of reference numerals 97, 97 is shown). More specifically, the cross members 91 to 93 are disposed across the lower main frames 42, 42. The cross member 94 is disposed across the inner seat support frames 71, 71. The rear first riser frames 96, 96 and the rear second riser frames 97, 97 are disposed across the corresponding ones of the lower main frames 42, 42 and the inner seat support frames 71, 71.

A bracket (not shown) supporting vertically swingably a rear wheel suspension arm is attached to each of the rear first riser frames 96, 96 and the rear second riser frames 97, 97.

The roll cage 36 includes a cross member 102, a pair of left and right rear posts 104, 104, an upper frame member 106, and a pair of left and right front posts 107, 107. Specifically, the cross member 102, which extends laterally, is disposed on the left and right inner seat support frames 71, 71 via brackets 101, 101. The rear posts 104, 104 are connected to the cross member 102 via joints 103, 103. The upper frame member 106 is connected to upper ends of the rear posts 104, 104 via joints 103, 103. The front posts 107, 107 are connected to left and right front portions of the upper frame member 106 via joints 103, 103 and have lower ends attached to the front cover 34 (see FIG. 1).

The rear posts 104, 104 include perpendicular portions 111, 111, inwardly extended portions 112, 112, a connection 113, and armrests 114, 114. Specifically, the perpendicular portion 111 extends horizontally toward an outside of the vehicle body from a connection to the cross member 102 and then extends substantially perpendicularly. The inwardly extended portion 112 has a laterally-facing U-shape extending inwardly of the vehicle body from the perpendicular portion 111. The connection 113 connects together the inwardly extended portions 112, 112. The armrest 114 is connected to the horizontal portion of the perpendicular portion 111 and the inwardly extended portion 112.

Figure 4:
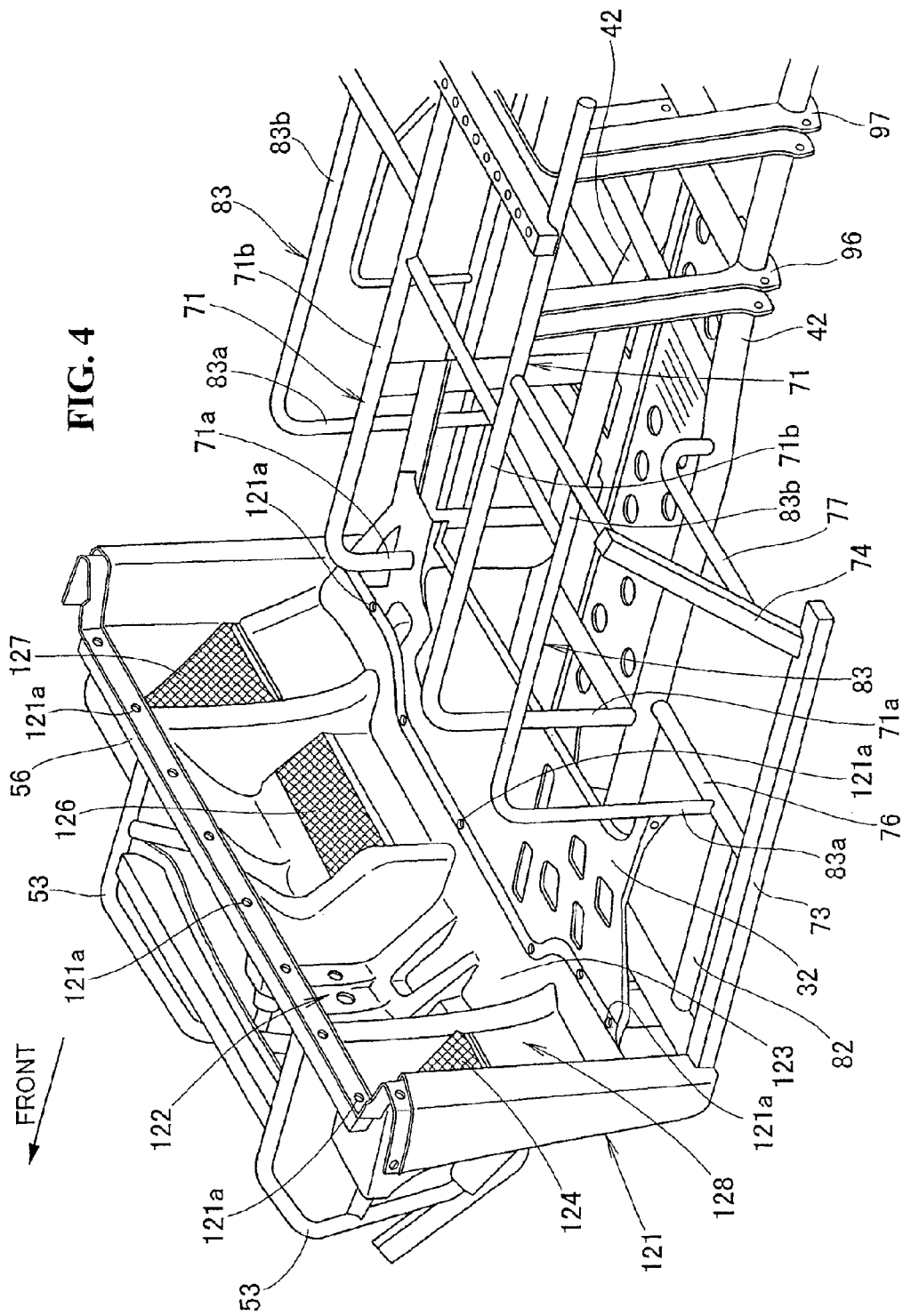
FIG. 4 is a perspective view showing the vehicle body frame and a dash panel according to the present invention.

FIG. 4 is a perspective view showing the vehicle body frame and a dash panel according to the present invention. A dash panel 121 formed of a resin is disposed ahead of the floor portion 32. The dash panel 121 delimits the cabin from a front wheel side.

The dash panel 121 includes a foot operation zone 123, a driver's footrest 124, and passenger's footrests 126, 127. Specifically, the foot operation zone 123 faces a foot operation space 122 in which a driver sitting in the left seat 25 (see FIG. 2) operates an accelerator pedal and a brake pedal with his or her right foot. The driver's footrest 124 is a footrest, on which the driver can rest his or her left foot. The passenger's footrests 126, 127 are footrests, on which a passenger sitting in the right seat 26 (see FIG. 2) can rest his or her feet. It should be noted that the driver's footrest 124 and the passenger's footrests 126, 127 are crosshatched for easier identification of positions of these footrests (the same applies hereunder).

The foot operation zone 123 and the driver's footrest 124 constitute a foot operation portion 128.

Each of the driver's footrest 124 and the passenger's footrests 126, 127 is inclined downwardly toward the rear so that the driver and the passenger can rest their feet easily. It is to be noted that reference numerals 121a denote screw insertion holes made in an upper edge and a lower edge of the dash panel 121, used for attaching the dash panel 121 to the upper cross member 56 and the floor portion 32.

The left rear cross member 77 disposed on the left of the vehicle body frame 11 is disposed at a level higher, for example, than the lower cross member 51. This reduces the likelihood that the left rear cross member 77 will contact a ground surface even when the vehicle is driven on a road surface having excessive irregularities, thus improving running performance on rough roads.

Figure 5:
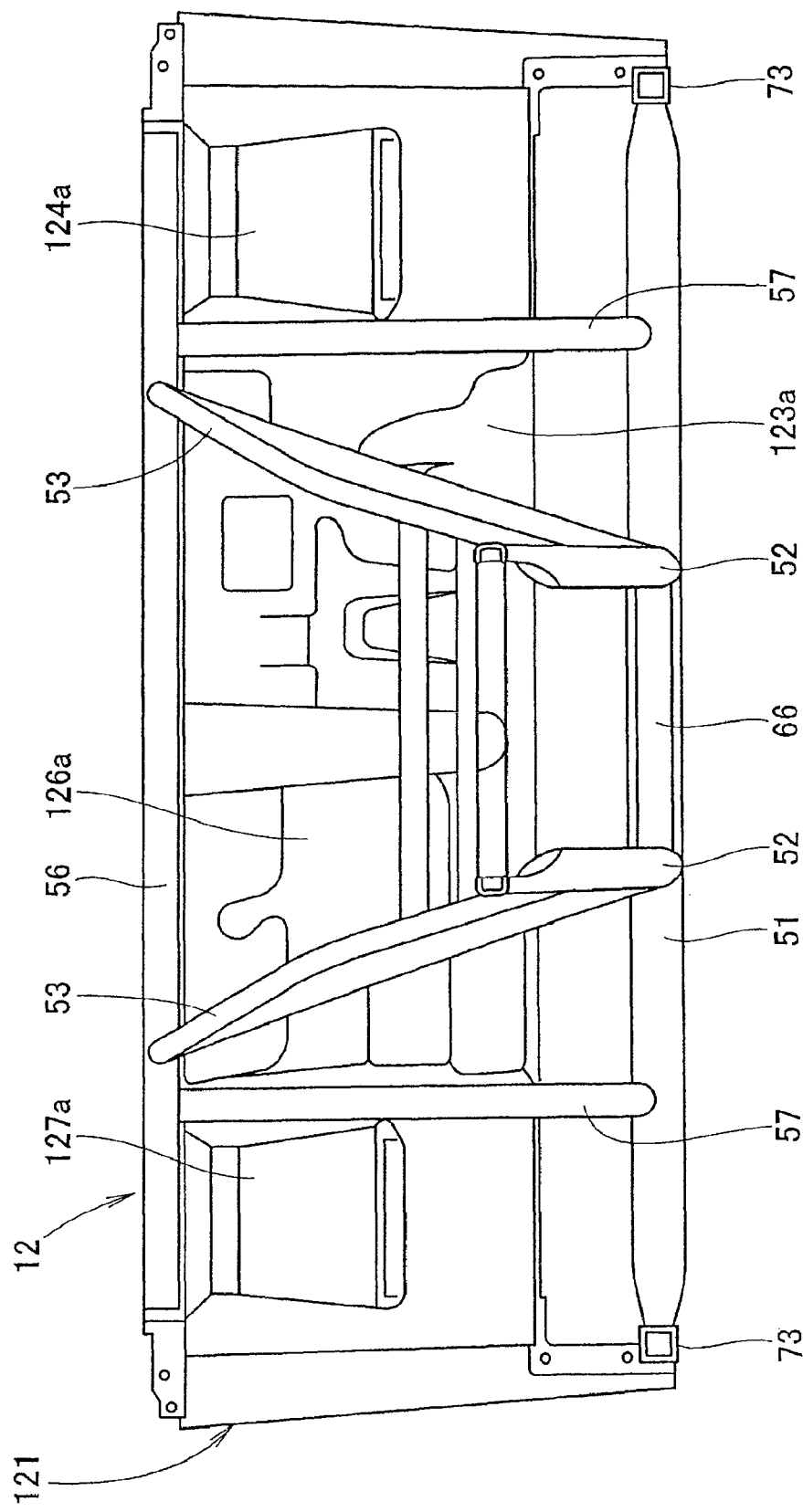
FIG. 5 is a front view showing a front frame and the dash panel according to the present invention.

FIG. 5 is a front view showing the front frame 12 and the dash panel 121 according to the embodiment of the present invention. The dash panel 121 is disposed so as to cover each rearward portion of the upper cross member 56 of the front frame 12 and upper portions of the left and right connection frames 57, 57.

The connection frames 57, 57 extend perpendicularly from respective positions inward of both ends of the lower cross member 51 and the upper cross member 56, thereby connecting the lower cross member 51 with the upper cross member 56. It is to be noted that reference numeral 123a denotes a back surface of the foot operation zone 123, reference numeral 124a denotes a back surface of the driver's footrest 124, and reference numerals 126a, 127a denote back surfaces of the passenger's footrests 126, 127, respectively.

Figure 6:
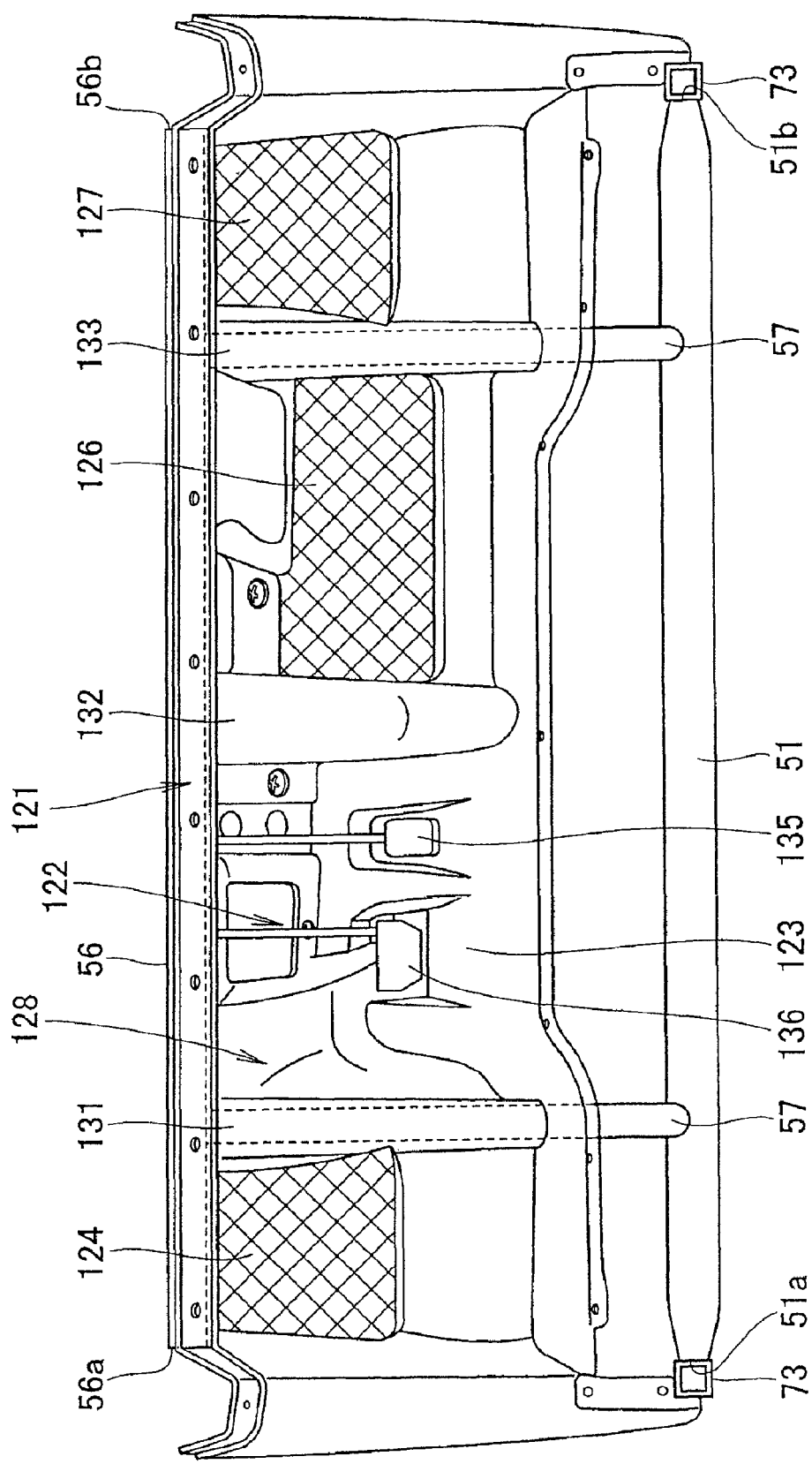
FIG. 6 is a back view showing the dash panel according to the present invention.

FIG. 6 is a back view showing the dash panel 121 according to the present invention. The dash panel 121 has three bulkheads; specifically, a bulkhead 131 disposed between the foot operation zone 123 and the driver's footrest 124, a bulkhead 132 disposed between the foot operation zone 123 and the passenger's footrest 126, and a bulkhead 133 disposed between the passenger's footrests 126, 127. It is to be noted that reference numeral 135 denotes the accelerator pedal and reference numeral 136 denotes the brake pedal, each being operated by the right foot of the driver.

The bulkheads 131 to 133 are curved to protrude toward the rear of the vehicle (to the front in FIG. 6). The connection frames 57, 57 are disposed forward (in the back in FIG. 6) of the bulkheads 131, 133.

The foregoing arrangement, in which the bulkhead 131 is disposed between the foot operation zone 123 and the driver's footrest 124 and the bulkhead 133 is disposed between the passenger's footrests 126, 127, results in the bulkheads 131, 133 protruding rearwardly being disposed between the two legs each of the driver and the passenger, respectively. The bulkheads 131, 133 do not therefore get in the way. Additionally, the bulkheads 131 to 133 serve as reinforcement ribs to enhance rigidity of the dash panel 121.

The driver's footrest 124 and the passenger's footrest 127 are disposed at a high position in the dash panel 121. This allows the driver and the passenger to support their bodies more easily, when, for example, the vehicle sways largely as it is driven on a road surface having excessive irregularities, by staying on their feet as they exert their forces on the driver's footrest 124 and the passenger's footrest 127.

Figure 7:
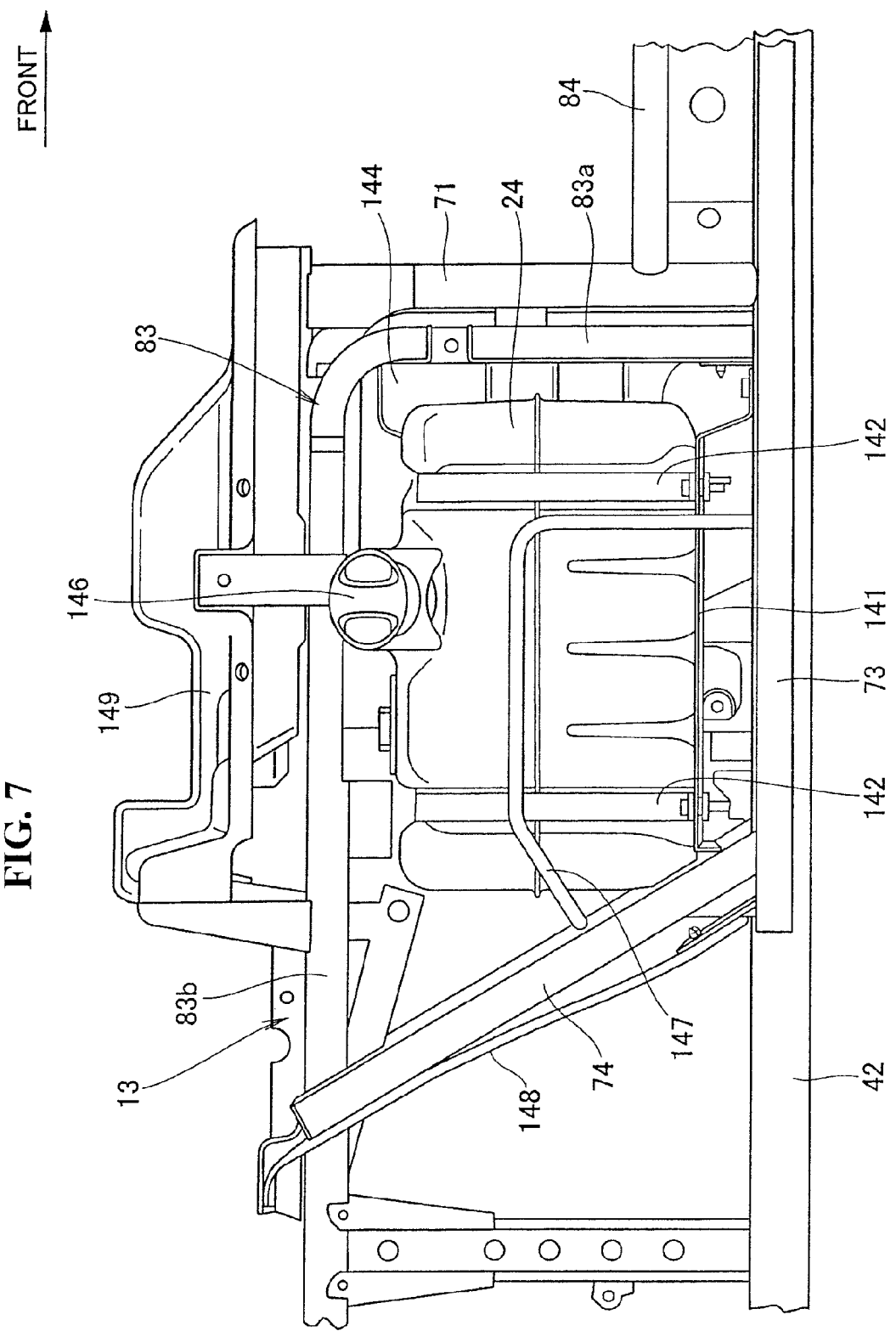
FIG. 7 is a side elevational view showing an arrangement of a fuel tank of the vehicle according to the present invention.

FIG. 7 is a side elevational view showing an arrangement of the fuel tank 24 of the vehicle 10 according to the present invention. A base member 141 is mounted below the center frame 13 and the fuel tank 24 is placed on the base member 141. Further, the fuel tank 24 is then secured to the base member 141 using a pair of band members 142, 142 having both ends attached to the base member 141.

The fuel tank 24 is disposed in a space upward and forward of the lower main frame 42, rearward of a perpendicular portion 83a of the outer seat support frame 83 and downward of a horizontal portion 83b of the outer seat support frame 83, and inward of the step outer frame 73 and the inclined frame 74.

A heat shielding cover 144 for isolating the fuel tank 24 from the power unit 21 (see FIG. 2) is disposed inward of the fuel tank 24.

FIG. 2 illustrates a cap plugging a fuel filler port 146 of the fuel tank 24; a guard member 147 attached to the step outer frame 73 and the inclined frame 74 for protecting the fuel tank 24 from a side; a rear cover 148 disposed rearward of the inclined frame 74 for protecting the fuel tank 24 from the rear; a seat lower cover 149 covering lower portions of the seats 25, 26.

Figure 8:
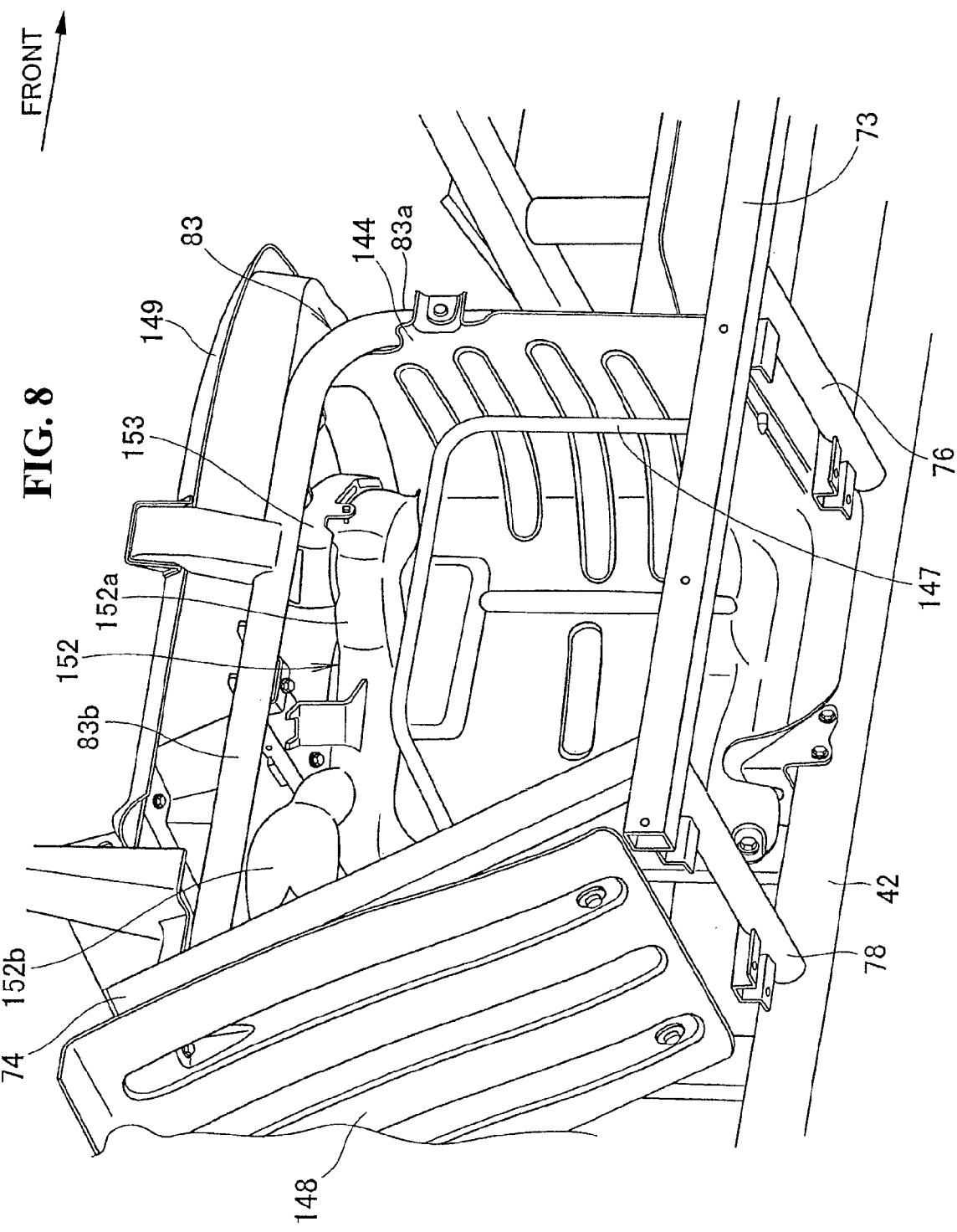
FIG. 8 is a perspective view illustrating a fuel tank arrangement space and a heat shielding cover in the vehicle according to the present invention.

FIG. 8 is a perspective view illustrating the fuel tank arrangement space and the heat shielding cover 144 in the vehicle 10 according to the present invention. For the sake of convenience, FIG. 8 omits the fuel tank 24 (see FIG. 7).

The heat shielding cover 144 is an L-shaped plate in a plan view. The heat shielding cover 144 has an inward side thereof disposed along the lower main frame 42 and a horizontal portion 71b (see FIG. 3) of the inner seat support frame 71 (see FIG. 3) and a front side thereof disposed so as to plug a space between a perpendicular portion 71a (see FIG. 3) of the inner seat support frame 71 and the perpendicular portion 83a of the outer seat support frame 83.

A front portion of an intake pipe 152 drawing air into an air cleaner (not shown) is disposed above a space, in which the fuel tank 24 is disposed.

The intake pipe 152 includes an intake pipe main body 152a and a resonator 152b integrated with the intake pipe main body 152a. A separate intake duct 153 serving as an air suction port is fitted to a leading end of the intake pipe main body 152a.

Figure 9:
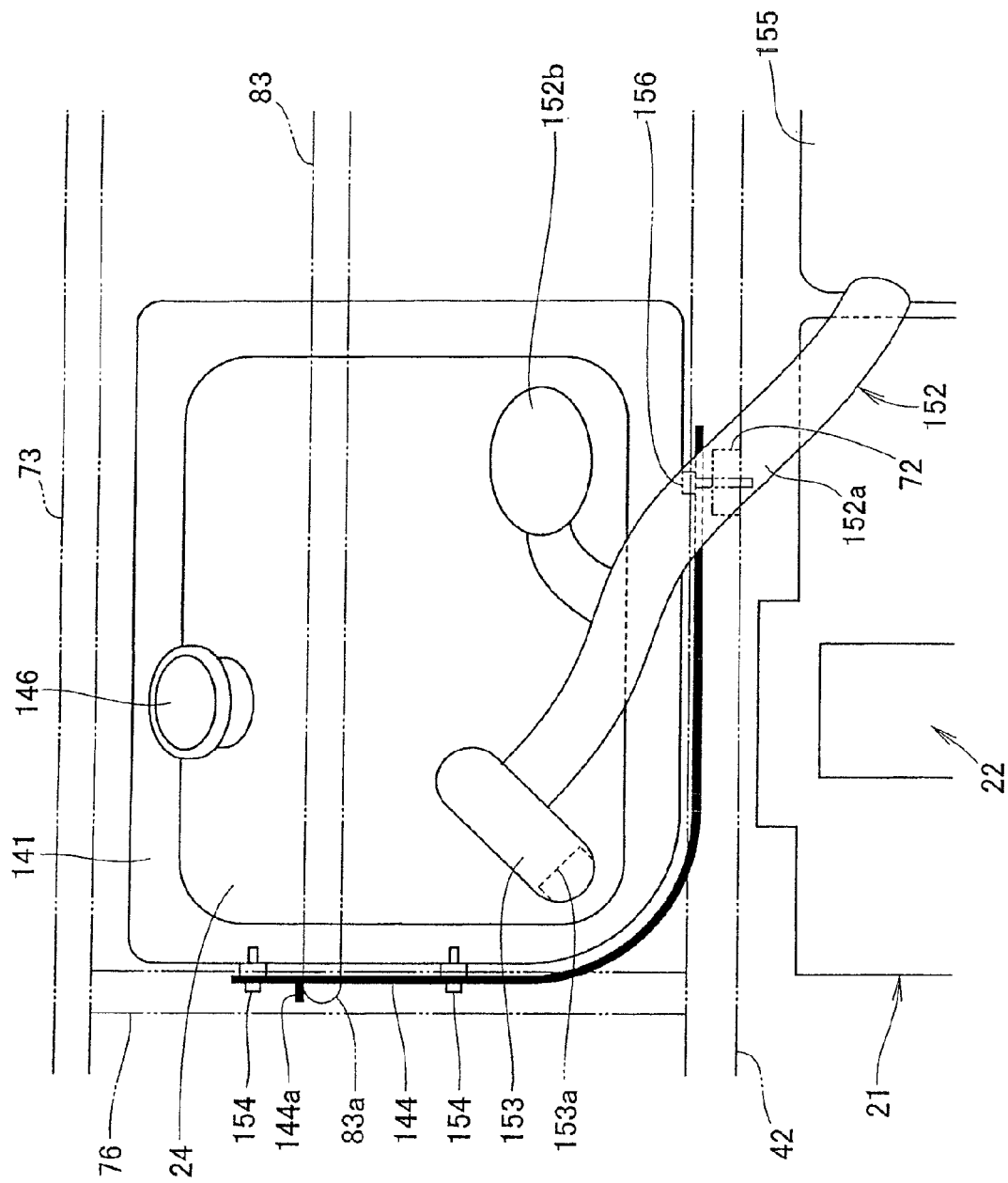
FIG. 9 is a plan view showing a principal part of the vehicle according to the present invention.

FIG. 9 is a plan view showing a principal part of the vehicle 10 according to the embodiment of the present invention. FIG. 9 shows an arrangement, in which the heat shielding cover 144 having an L shape in a plan view (in FIG. 9, the heat shielding cover 144 is painted in black for ease of understanding of the shape thereof) is disposed between the power unit 21 and the fuel tank 24. FIG. 9 also shows that the intake duct 153 having an air intake port 153a is disposed in a space on the side of the fuel tank 24 relative to the heat shielding cover 144. It is to be noted that reference numeral 144a denotes a mounting tab integrally formed with the beat shielding cover 144 for attaching the heat shielding cover 144 to the perpendicular portion 83a of the outer seat support frame 83; reference numerals 154, 154 denote screws for securing the heat shielding cover 144 to the base member 141; and reference numeral 156 denotes a screw for securing the heat shielding cover 144 to the center riser frame 72.

Disposing the intake duct 153 in the space in which the fuel tank 24 is disposed allows air not heated by the engine 22 of the power unit 21 to be drawn into the intake pipe 152. The air can then be supplied to the engine 22 via an air cleaner 155 from the intake pipe 152. This enhances intake charging efficiency for the engine 22.

Figure 10:
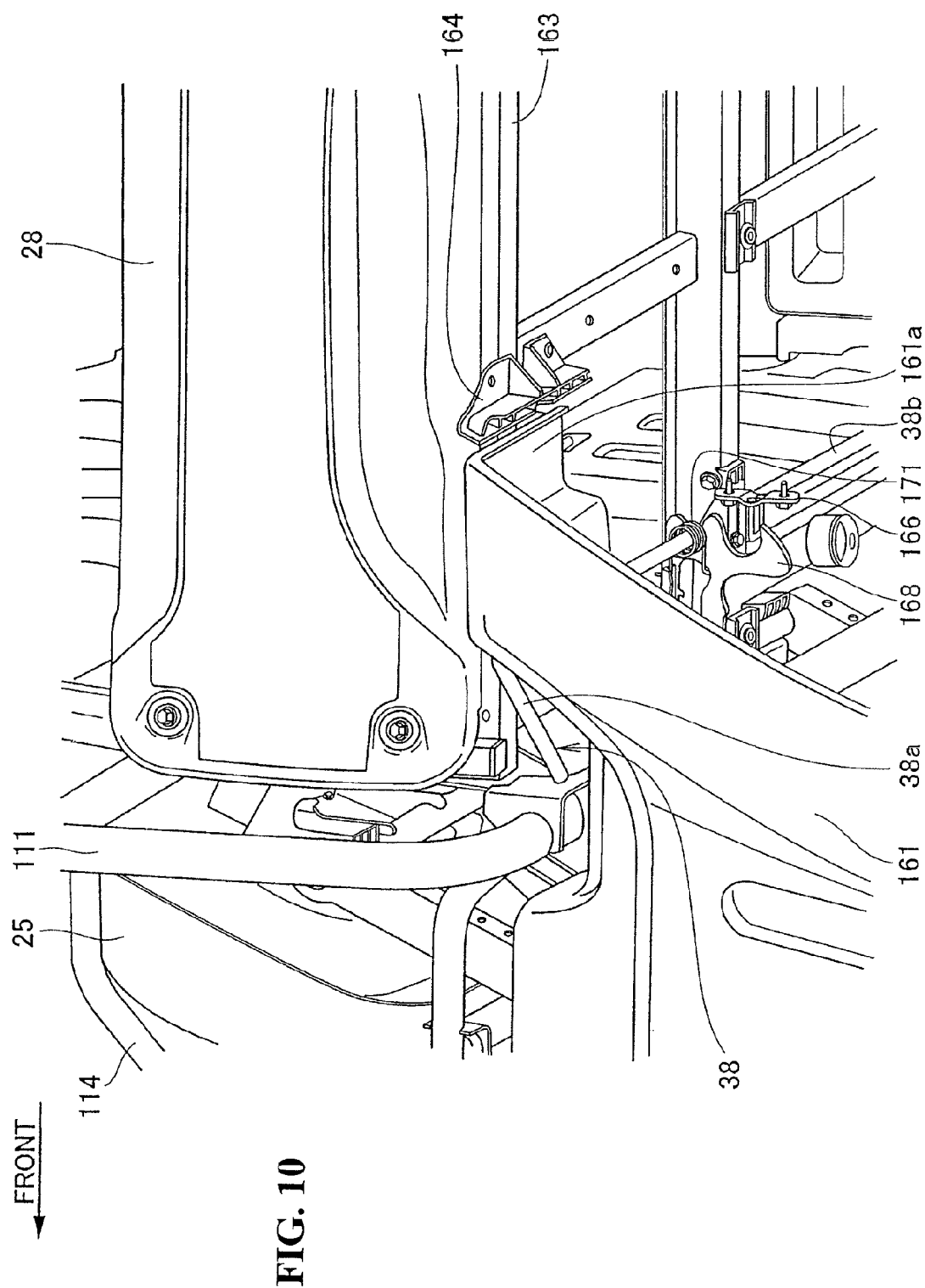
FIG. 10 is a perspective view showing an area near a cargo bed of the vehicle according to the present invention.

FIG. 10 is a perspective view showing an area near the cargo bed 28 of the vehicle 10 according to the present invention. FIG. 10 shows an arrangement, in which a side cover 161 covering a side of the vehicle body includes a cover extension 161a extending inwardly of the vehicle body. The cover extension 161a is disposed at an upper portion in the rear of the side cover 161. FIG. 10 further shows that a pair of left and right mud guards 164, 164 (only one of reference numerals 164, 164 is shown) are disposed on a pair of left and right cargo bed outer frames 163, 163 (only one of reference numerals 163, 163 is shown) extending longitudinally to constitutes the cargo bed 28. The mud guard 164 is disposed rearward of the cover extension 161a.

The mud guard 164 prevents mud splashed by the rear wheel 27 (see FIG. 1) from entering a gap between the cargo bed 28 and the cover extension 161a of the side cover 161. The mud guard 164 has a mounting portion, with which both of the left and right mud guards 164, 164 can be commonly mounted to the cargo bed outer frame 163.

The operation lever 38 includes a pair of left and right operation portions 38a, 38a (only one of reference numerals 38a, 38a is shown) and a straight portion 38b disposed integrally between the two operation portions 38a, 38a. The operation portions 38a, 38a are operated by hand.

FIG. 10 shows an engagement bracket 166 affixed to the inner seat support frame 71 (see FIG. 3); a hook 168 mounted in a straight portion 167 and engaged with the engagement bracket 166 by an elastic force of a torsion coil spring 171. The cargo bed 28 is normally in a locked state and the front portion thereof does not swing upward, because the engagement bracket 166 is engaged with the hook 168.

Figure 11:
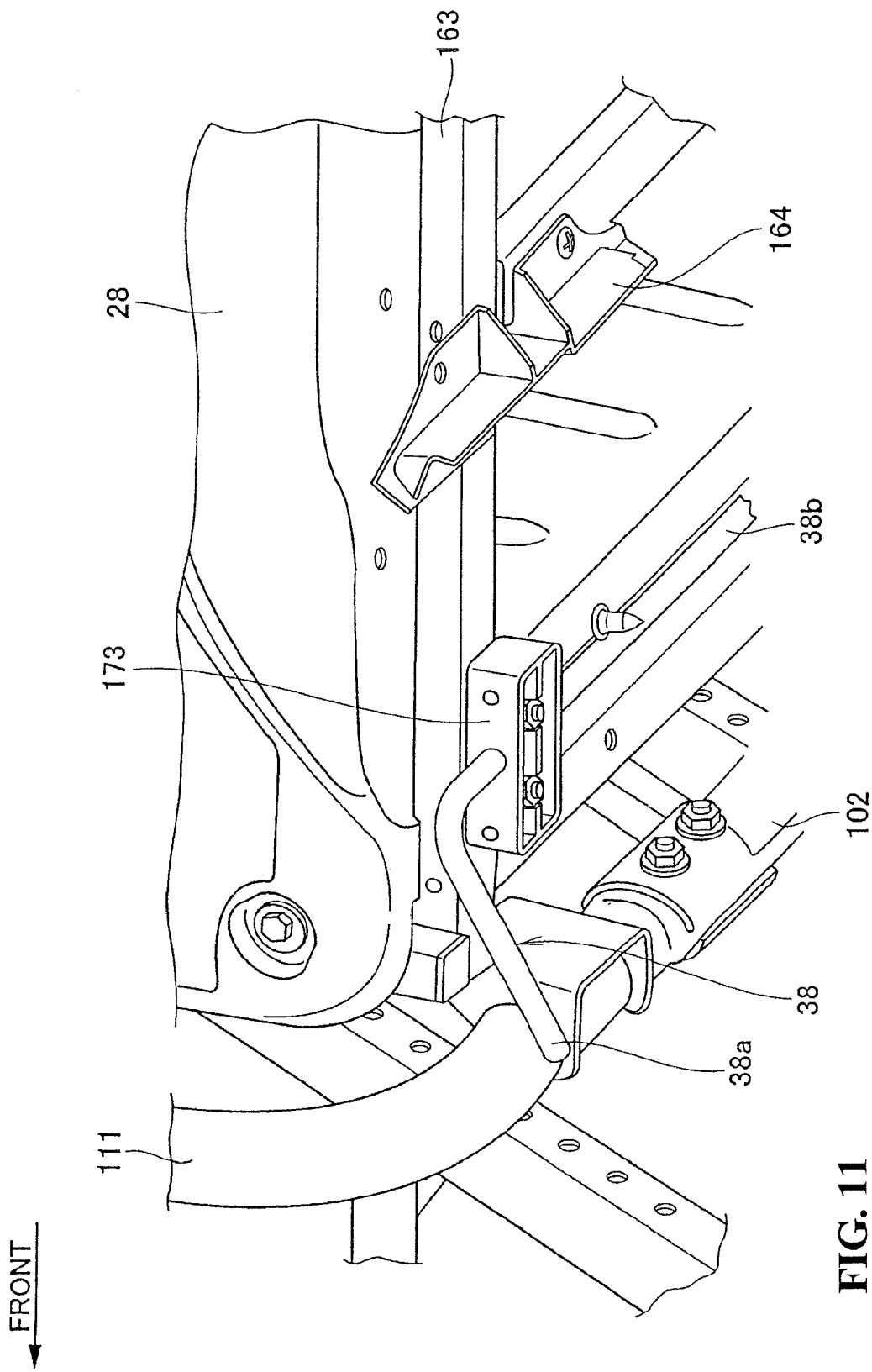
FIG. 11 is a perspective view showing a principal part on an underside of the cargo bed of the vehicle according to the present invention.

FIG. 11 is a perspective view showing a principal part on an underside of the cargo bed 28 of the vehicle 10 according to the present invention. FIG. 11 shows where the side cover 161 shown in FIG. 10 is removed.

A support member 173 is disposed on the cargo bed outer frame 163 at a position forward of the mud guard 164. The support member 173 rotatably supports the straight portion 38b of the operation lever 38.

Specifically, the mud guard 164 prevents mud from sneaking through a gap between the cargo bed 28 and the cover extension 161a (see FIG. 10) of the side cover 161 (see FIG. 10) and entering the portion at which the support member 173 supports the straight portion 38b. Accordingly, the support member 173 ensures smooth rotation of the operation lever 38.

Figure 12:
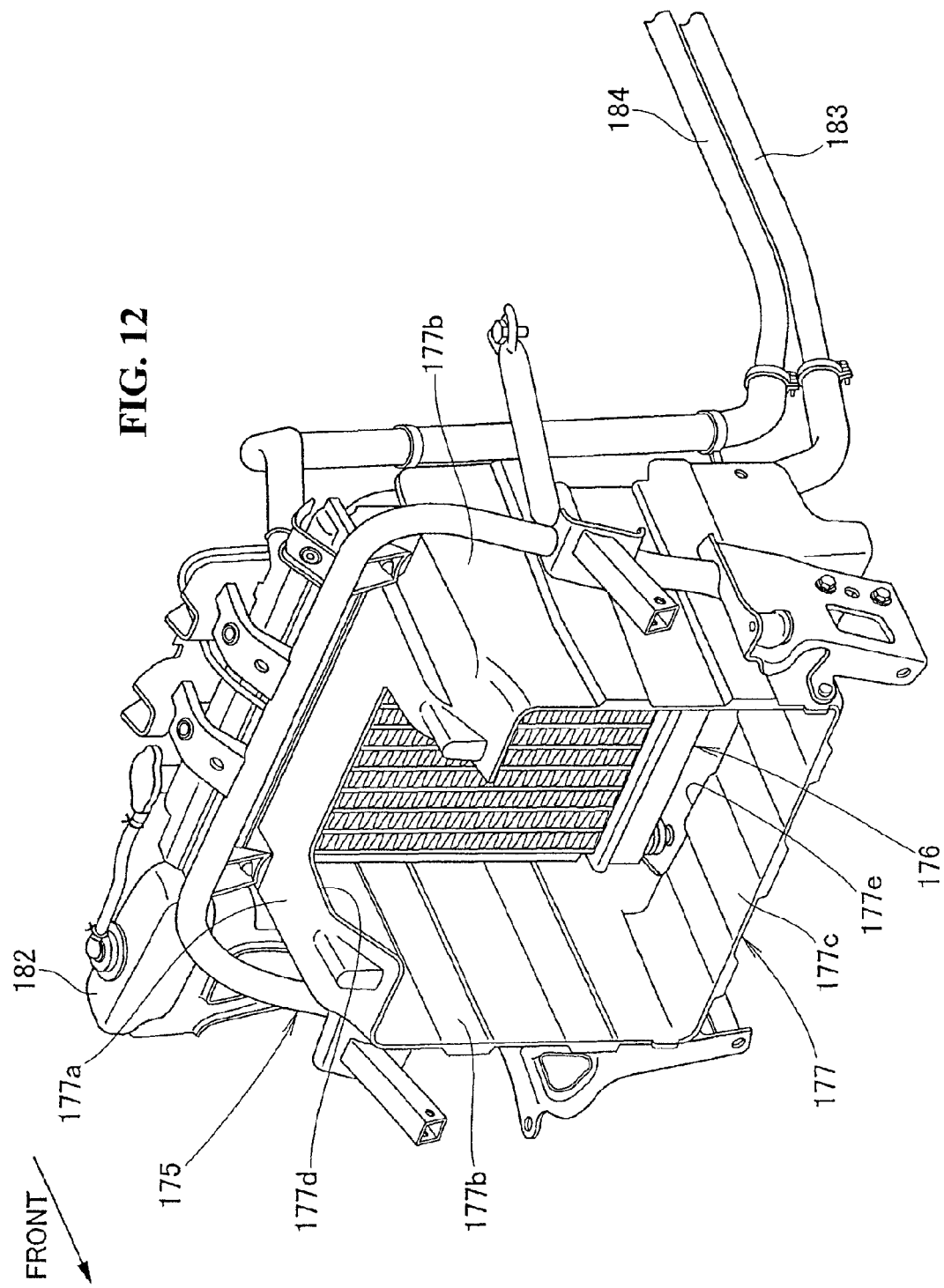
FIG. 12 is a perspective view showing an area around a radiator of the vehicle according to the present invention.

FIG. 12 is a perspective view showing an area around a radiator of the vehicle 10 according to the present invention. FIG. 12 shows that a radiator support frame 175 is disposed at a front portion of the front frame 12 (see FIG. 1). FIG. 12 further shows that the radiator support frame 175 supports upper and lower portions of a radiator 176 and that a wind deflector 177 made of a resin for guiding wind to the radiator 176 is fitted to the radiator support frame 175.

The wind deflector 177 is of a box shape having open front and rear portions. The wind deflector 177 has an upper wall 177a and left and right side walls 177b, 177b attached to the radiator support frame 175. The upper wall 177a includes a cutout 177d made at a front portion thereof. A lower wall 177c has a cutout 177e made at a rear portion thereof.

A front grille not shown is mounted on the front portion of the wind deflector 177. When a foreign object enter in the wind deflector 177 disposed between the front grille and the radiator 176, the foreign object can be removed through the cutouts 177d, 177e.

Figure 13:
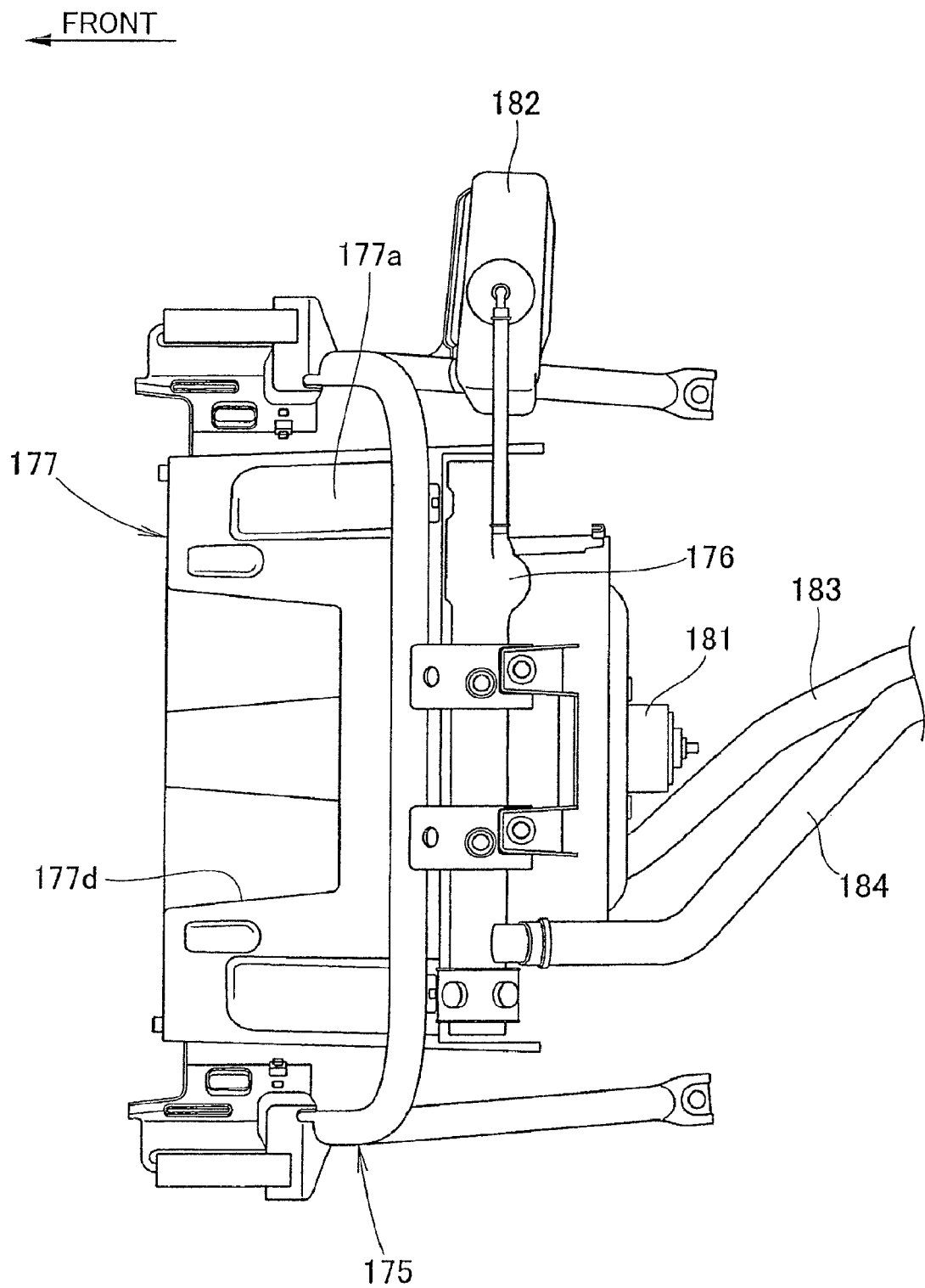
FIG. 13 is a plan view showing an area around the radiator of the vehicle according to the present invention.

FIG. 13 is a plan view showing an area around the radiator 176 of the vehicle 10 according to the present invention. FIG.

13 shows that the cutout 177d having a trapezoidal shape is formed at the front portion of an upper wall 177a of the wind deflector 177. The radiator support frame 175 has an upper portion disposed rearward of the cutout 177d so as to circumvent the cutout 177d such that an inside of the wind deflector 177 can be reached through the cutout 177d. It is to be noted that reference numeral 181 denotes a cooling fan disposed rearward of the radiator 176; reference numeral 182 denotes a reservoir tank storing coolant that flows in and out of the radiator 176; and reference numerals 183, 184 denote radiator hoses.

Figure 14:
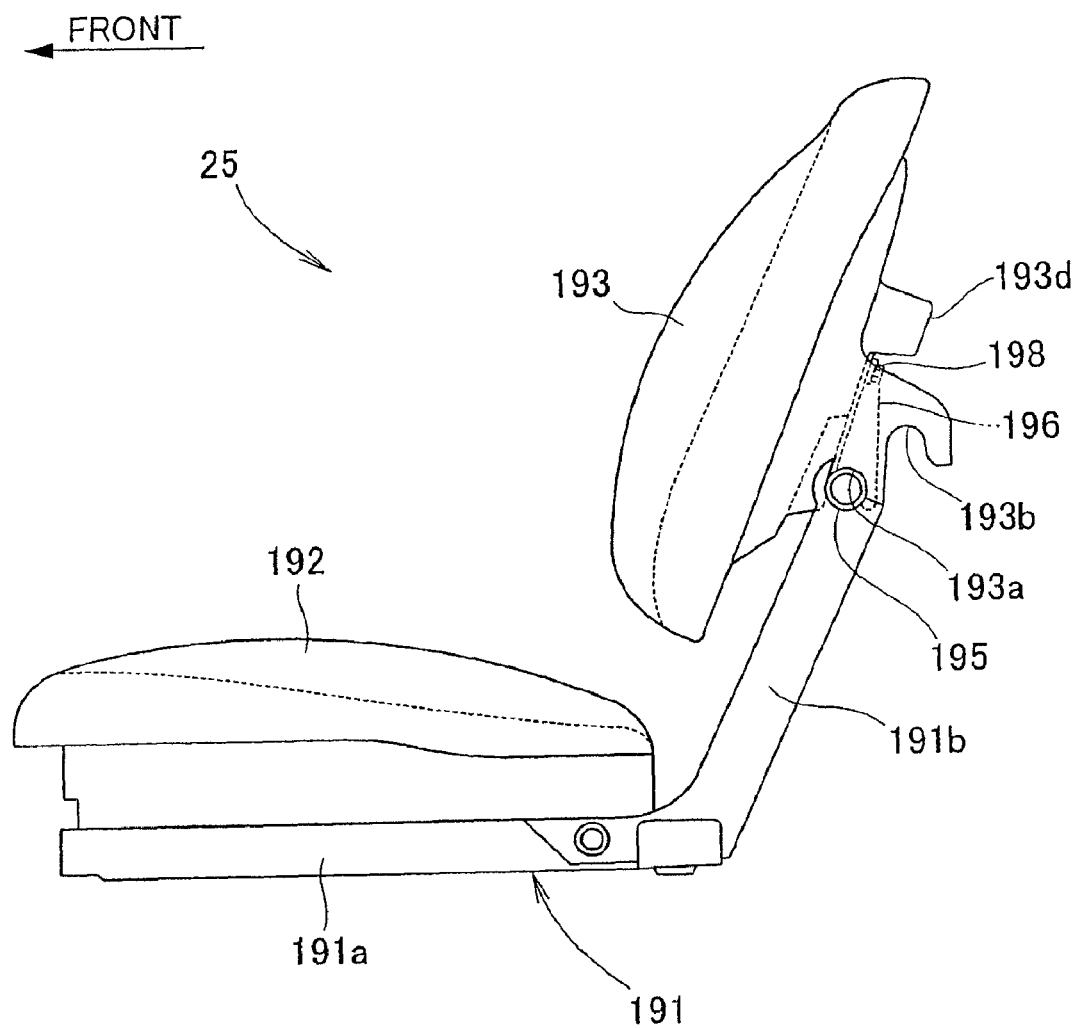
FIG. 14 is a side elevational view showing a seat of the vehicle according to the present invention.

FIG. 14 is a side elevational view showing the seat 25 of the vehicle 10 according to the present invention. The seat 25 includes a seat frame 191, a seat cushion 192, and a seat back 193. Specifically, the seat frame 191 includes a horizontal portion 191a and an inclined portion 191b extending obliquely upwardly toward the rear from a rear end of the horizontal portion 191a. The seat cushion 192 is mounted on the horizontal portion 191a of the seat frame 191. The seat back 193 is disposed at an upper end of the seat frame 191. A position of the seat back 193 is adjustable longitudinally and vertically.

Figure 15A:
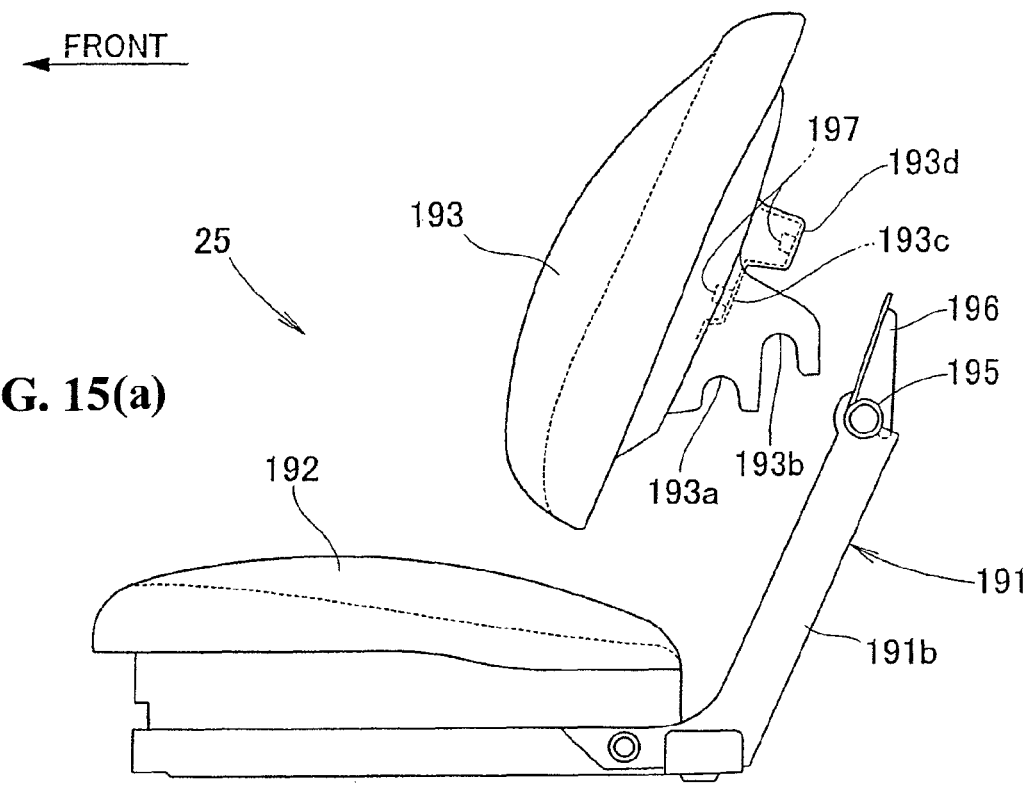
FIGS. 15(a) and 15(b) are views for illustrating in detail a seat structure of the vehicle according to the present invention.
Figure 15B:
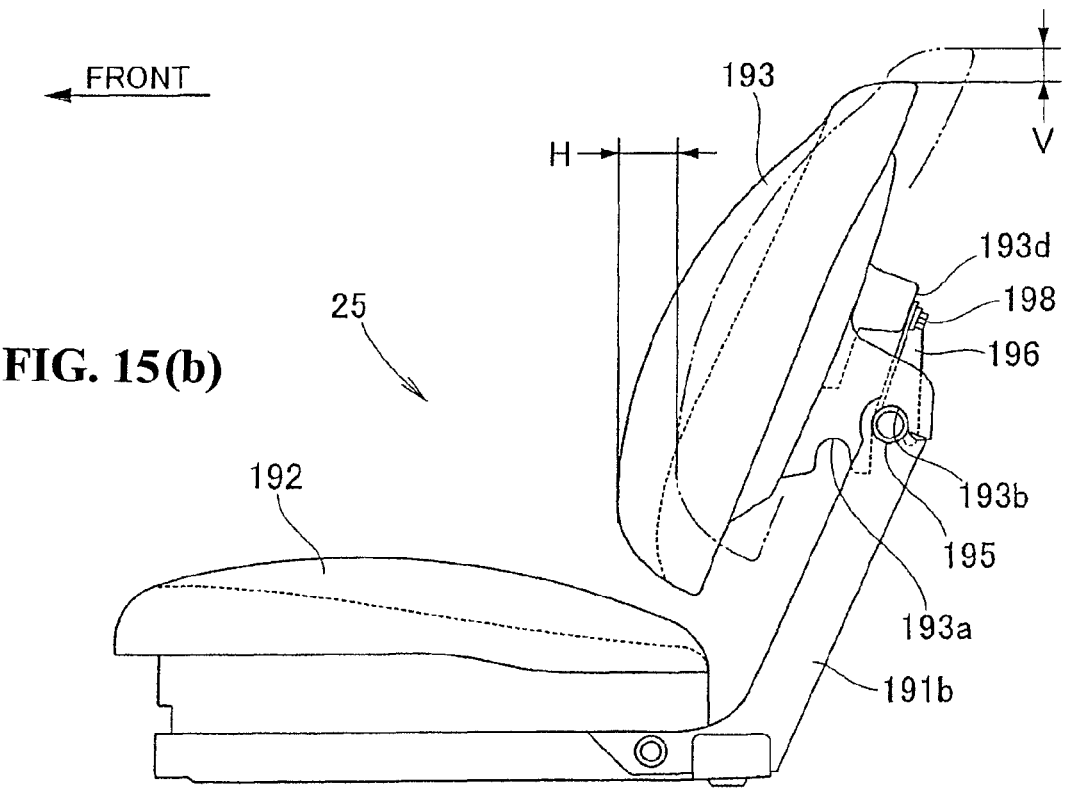

FIGS. 15(a) and 15(b) are views for illustrating in detail a seat structure of the vehicle 10 according to the present invention.

Referring to FIG. 15(a), the inclined portion 191b of the seat frame 191 includes a cross member 195 and a mounting tab 196. The cross member 195 disposed at an upper end of the seat frame 191 extends in a vehicle width direction. The mounting tab 196 extends upwardly from the cross member 195.

The seat back 193 includes a pair of left and right first hooks 193a, 193a (only one of reference numerals 193a, 193a is shown), a pair of left and right second hooks 193b, 193b (only one of reference numerals 193b, 193b is shown), and a first protrusion 193c and a second protrusion 193d. Specifically, the first hooks 193a, 193a and the second hooks 193b, 193b are formed in a backside of the seat back 193, at which the cross member 195 is hooked. The two hooks 193a, 193b are formed in a stepped fashion. The first protrusion 193c and the second protrusion 193d are formed in a stepped fashion. Each of the first protrusion 193c and the second protrusion 193d has a nut 197 embedded therein for being mounted to the mounting tab 196 on the side of the inclined portion 191b. The seat 26 (see FIG. 2) has the same structure as the above-described seat 25.

Referring to FIG. 14, the first hooks 193a, 193a of the seat back 193 are hooked onto the cross member 195 and the first protrusion 193c is attached to the mounting tab 196, so that the seat back 193 is disposed more toward the rear and above.

In a condition shown in FIG. 15(b), the second hooks 193b, 193b of the seat back 193 are hooked onto the cross member 195 and the second protrusion 193d is attached to the mounting tab 196 by a bolt 198 threadably screwed into the nut 197, so that the seat back 193 is adjusted more toward the front and below. In FIG. 15(b), reference numeral H denotes an adjustment amount of the seat back 193 in the longitudinal direction and reference numeral V denotes an adjustment amount of the seat back 193 in the vertical direction.

As described above, the seat back 193 of the seat 25 can be adjusted easily through a simple construction according to a body type and preference of a person to sit therein.

As described above with reference to FIGS. 1, 2, 14, and 15(a) and 15(b), the present invention is applicable to the vehicle 10 having the seats 25, 26 supported on the vehicle body frame 11 via the seat frame 191 serving as the seat support member, each of the seats 25, 26 including the seat back 193 as a backrest supporting a back of a driver. In this vehicle 10, the seat back 193 is removably mounted in the seat frame 191 and permits positional adjustments in the vertical and longitudinal directions. The position of the seat back 193 in the vertical and longitudinal directions can therefore be adjusted to fit the body type of the driver for greater ease of driving.

Further, in accordance with the present invention, the first hook 193a and the second hook 193b, disposed upwardly and rearwardly of the first hook 193a, are formed in the backside of the seat back 193. The first hook 193a and the second hook 193b can be selectively hooked onto the side of the seat frame 191. The vertical and longitudinal positions of the seat back 193 can therefore be changed with the simple structure, contributing to a reduced cost.

Moreover, in accordance with the present invention, the seat frame 191 includes the cross member 195 and the mounting tab 196. The cross member 195 disposed at the upper rear end of the seat frame 191 extends in the vehicle width direction. The mounting tab 196 extends upwardly from the cross member 195. Either the first hook 193a or the second hook 193b is hooked onto the cross member 195. The seat back 193 further includes the first protrusion 193c and the second protrusion 193d disposed on the backside thereof. The first protrusion 193c is removably attached to the mounting tab 196 by the bolt 198 when the first hook 193a is hooked onto the cross member 195. The second protrusion 193d is removably attached to the mounting tab 196 by the bolt 198 when the second hook 193b is hooked onto the cross member 195. The seat back 193 can thereby be reliably supported through the respective combination of the first hook 193a and the first protrusion 193c and of the second hook 193b and the second protrusion 193d.

The backrest structure according to the present invention is well adapted for three-wheeled and four-wheeled vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A backrest structure for a vehicle, the vehicle comprising:
   a seat supported on a vehicle body frame via a seat support member,
   the seat support member including a cross member disposed at an upper rear end of the seat support member, the cross member extending in a vehicle width direction,
   the seat including a backrest supporting a back of a driver,
   wherein the backrest is removably mounted on the cross member and permits positional adjustments in vertical and longitudinal directions,
   wherein the backrest includes:
      a first hook and a second hook disposed upwardly and rearwardly of the first hook, the first hook and the second hook being disposed on a backside of the backrest; the first hook and the second hook being selectively hooked onto the cross member,
   wherein the seat support member includes:
      a mounting tab extending upwardly from the cross member, either the first hook or the second hook being hooked onto the cross member;
   wherein the backrest includes:
      a first protrusion removably attached to the mounting tab when the first hook is hooked onto the cross member; and a second protrusion removably attached to the mounting tab when the second hook is hooked onto the cross member, the first protrusion and the second protrusion being disposed on the backside of the backrest.

2. The vehicle backrest structure according to claim 1, wherein the first hook and the second hook are formed in a stepped fashion, and the first protrusion and the second protrusion are formed in a stepped fashion.

3. The vehicle backrest structure according to claim 1, wherein the first protrusion has a first nut embedded therein and the second protrusion has a second nut embedded therein,
wherein the backrest is mounted on the seat support member by a bolt screwed into either the first nut or the second nut, depending on the positional adjustments desired in the vertical and longitudinal direction.

4. The vehicle backrest structure according to claim 1, wherein the seat support member includes a horizontal portion and an inclined portion extending obliquely upwardly toward the rear from a rear end of the horizontal portion, and backrest is disposed at an upper end of the inclined portion.

5. A backrest structure for a vehicle, the vehicle comprising:
a seat supported on a vehicle body frame via a seat support member,
the seat support member including a cross member and a mounting tab, the cross member being provided at an upper rear end of the seat support member, the cross member extending in a vehicle width direction, and the mounting tab extending upwardly from the cross member;
the seat including a backrest supporting a back of a driver, the backrest including:
a pair of left and right first hooks and a pair of left and right second hooks, each of the second hooks disposed upwardly and rearwardly of the corresponding first hook, the left and right first hooks and the left and right second hooks being disposed on a backside of the backrest,
a first protrusion removably attached to the mounting tab when the left and right first hooks are hooked onto the cross member; and
a second protrusion removably attached to the mounting tab when the left and right second hooks are hooked onto the cross member, the first protrusion and the second protrusion being disposed on the backside of the backrest,
wherein the backrest is adapted to be removably mounted onto the cross member by attaching either the left and right first hooks or the left and right second hooks onto the cross member, and thus is adapted to be adjusted in a vertical and a longitudinal direction between at least two alternative positions.

6. The vehicle backrest structure according to claim 5, wherein the left first hook and the left second hook are formed in a stepped fashion, the right first hook and the right second hook are formed in a stepped fashion, and the first protrusion and the second protrusion are formed in a stepped fashion.

7. The vehicle backrest structure according to claim 5, wherein the first protrusion has a first nut embedded therein and the second protrusion has a second nut embedded therein,
wherein the backrest is mounted on the seat support member by a bolt screwed into either the first nut or the second nut, depending on the positional adjustments desired in the vertical and longitudinal direction.

8. The vehicle backrest structure according to claim 5, wherein the seat support member includes a horizontal portion and an inclined portion extending obliquely upwardly toward the rear from a rear end of the horizontal portion, and backrest is disposed at an upper end of the inclined portion.

* * * * *